Figure 1:
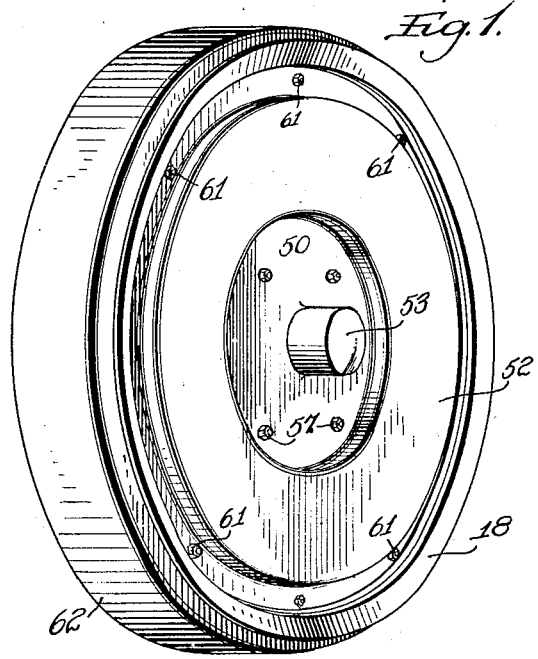

April 28, 1931.  D. E. TUTT  1,802,686
RESILIENT WHEEL
Filed Jan. 15, 1929   2 Sheets-Sheet 1

Inventor
DULY E. TUTT

G.W. Earnshaw
Attorney

April 28, 1931.  D. E. TUTT  1,802,686
RESILIENT WHEEL
Filed Jan. 15, 1929  2 Sheets-Sheet 2
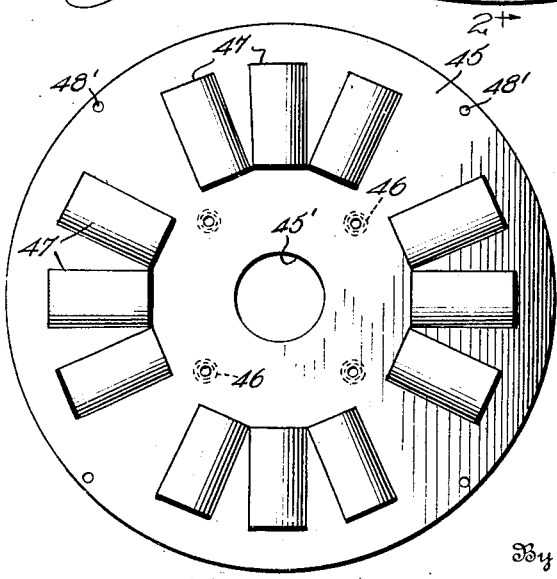
Inventor
DULY E. TUTT
By
G. W. Earnshaw
Attorney Patented Apr. 28, 1931

1,802,686

UNITED STATES PATENT OFFICE

DULY E. TUTT, OF GALENA, KANSAS

RESILIENT WHEEL

Application filed January 15, 1929. Serial No. 332,645.

This invention relates to resilient wheels and more particularly to wheels of this type adapted for use with heavy vehicles, such as trucks and the like, whereon solid or non-pneumatic tires are employed.

An object of this invention is to provide a resilient wheel capable of absorbing severe shocks and strains and adapted to equally distribute the force of such shocks and strains throughout the greater portion of the area of the wheel.

Another object is to provide a wheel of the type referred to provided with an inner and outer rim and having a plurality of radially disposed coil springs loosely mounted between said rims.

A further object is to provide a wheel of the type referred to provided with an inner and outer rim and having a plurality of pivoted links arranged between said rims to assist in distributing shocks throughout the area of the wheel.

A further object is to provide a wheel of the type referred to having an inner portion formed of a pair of spaced annular disks secured together and having a hub portion adapted to be secured to the axle of a vehicle, said inner portion being joined to an outer annular portion by a plurality of pivoted links.

A further object is to provide a wheel of the type referred to having an inner and outer rim secured together by novel means, and provided with a pair of annular disks, one of said disks being adapted to engage a portion of the means for joining said inner and outer rims together, the other of said disks carrying spacing means for spacing said disks apart.

A further object is to provide a wheel of the type referred to having inner and outer rims adapted to be secured together and having a pair of inner annular disks and a pair of outer annular disks, all of said disks being secured together to form a compact device.

Other objects and advantages of the invention will become apparent during the course of the following description.

Figure 2:
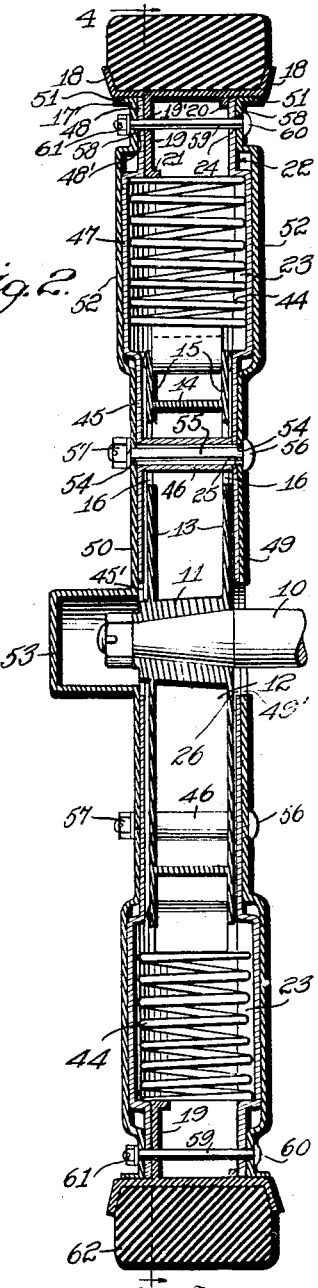
Figure 3:
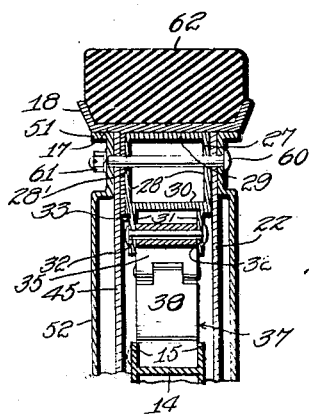

In the drawings I have shown one embodiment of the invention. In this showing,

Figure 1 is a perspective view of an assembled wheel,

Figure 2 is a central vertical section taken substantially on line 2—2 of Figure 4, Figure 3 is a section taken substantially on the line 3—3 of Figure 4, Figure 4 is a similar view on line 4—4 of Figure 2, Figure 5 is a front elevation of one of the annular disks, and Figure 6 is a side elevation of same.

Referring now to the drawings, the numeral 10 designates a vehicle axle and keyed or otherwise secured thereto is a hub 11 of an inner wheel portion 12. The member 12 comprises a pair of annular disks 13, preferably formed of sheet steel or the like, and joined together inwardly of their outer extremities by a transverse annular portion 14, preferably formed of sheet steel or the like. If desired, the disks 13 may be formed integral with the transverse portion 14. As shown in Figures 2 and 3, the disks 13 are provided with annular portions 15 which extend outwardly of the transverse member 14. Inwardly of the member 14, the disks are provided with a plurality of relatively large spaced openings 16, the purpose of which will become apparent.

Surrounding the inner portion 12, and circumferentially spaced therefrom, is an outer annular rim 17, preferably formed of sheet steel or the like, and having annular flanges 18, preferably formed integral therewith to aid in securing a tire on said rim. As shown in Figure 2, the rim 17 is provided with a pair of inwardly extending annular ribs 19 and 20, preferably formed integral therewith, the rib 19 extending a substantial distance inwardly and having an annular bead or flange 21 formed on its inner periphery. A plurality of openings 19' are provided in the rib 19, the purpose of which will become apparent.

Means are provided for securing the outer rim 17 to the inner portion 12. As shown in Figures 2 and 3 a relatively large annular disk 22, preferably formed of sheet steel or the like, and provided with a plurality of radial grooves or depressions 23, is arranged on the inner side of the wheel. The outer portion of the disk 22 engages the rib 20 on the rim 17, and adjacent its outer periphery the disk is provided with a plurality of spaced openings 24 in alinement with the openings 19' in the rib 19, adapted to receive suitable securing means, as will be understood. A substantial distance inwardly of the openings 24, the disk is also provided with a plurality of spaced openings 25, also adapted to receive suitable securing means, and a relatively large central opening 26 is provided, the purpose of which will become apparent.

The annular rib 20 of the rim 17 is cut away at spaced intervals and as shown in Figure 3 a plurality of substantially rectangular shaped brackets 27 are adapted to fit between the disk 22 and the annular rib 19, the top of said brackets extending through the cut away portions of the rib 20 and being welded or otherwise secured to the inner periphery of the rim 17. Each bracket 27 comprises inwardly extending side arms 28 and upper and lower transverse arms 29 and 30 respectively, preferably formed integral with the side arms. An opening 28' is provided in each side arm 28 in alinement with the openings in the rib 19 and disk 22. Adjacent the lower transverse member 30 the bracket is provided with relatively short inwardly extending arms 31 preferably formed integral with the transverse member, and provided with a plurality of alined openings 32. One side arm 28 is preferably welded or otherwise suitably secured to the disk 22 adjacent its outer periphery, and the opposite arm 28 is preferably welded or otherwise suitably secured to the rib 19, the flange 21 of said rib snugly engaging the inner extremity of the arm 28 as shown at 33.

Pivotally mounted between the arms 31 of the bracket, by means of suitable pivot pins 34 or the like extending through the openings 32, is a relatively short link 35 and pivotally secured to the link 35 by means of a pivot pin 36 or the like is a relatively long angularly shaped link 37. As shown in Figure 4, the link 37 comprises a portion 38 extending inwardly to a point adjacent the outer periphery of the disks 13, and the link is then curved to follow substantially the contour of said peripheral portion, as shown at 39, the inner extremity of said link being turned inwardly as shown at 40. The transverse member 14 is provided with spaced openings 41 into which the extremities 40 of the links extend. The extremity 40 of the link terminates in a loop as shown at 42, and the disks 13 are provided with openings 42' in alinement with the extremities of the looped portion. A pivot pin or the like 43 is adapted to secure the looped portion between said openings, as will be understood.

A plurality of radially disposed coil springs 44 are loosely mounted between the inner and outer rims, and as shown in Figures 2 and 4, these springs are adapted to snugly fit into the radial grooves 23 of the disk 22. The inner extremity of the coil springs engage the outer surface of the portion 39 of the links 37, as shown in Figure 4, and the outer extremity engages the inner periphery of the rib 19, and also engages the outer wall of the groove 23.

An annular disk 45 of substantially the same size and preferably formed of the same material as the disk 22 is provided with a plurality of tubular spacing members 46, preferably formed integral with the disk 45, and arranged substantially at right angles thereto. A plurality of radial grooves 47 are provided in the disk 45, similar in size and shape to the grooves 23. As shown in Figure 2, the disk 45 is adapted to be placed on the outside of the wheel, the outer portion 48 of the disk engaging one side of the rib 19, the grooves 47 being arranged in alinement with the grooves 23 whereby the coil spring 44 will snugly fit within said grooves, and the tubular spacers 46 being arranged in alinement with the openings 25 in the disk 22. The disk 45 is provided with a relatively large central opening 45' in alinement with the similar opening in disk 22, and adjacent its outer periphery the disk 45 is provided with a plurality of openings 48' in alinement with the openings in the rib 19.

A pair of outer annular disks 49 and 50 preferably formed of sheet steel or the like, are adapted to enclose the working parts of the device between them. The disks 49 and 50 are provided with peripheral flanges 51 adapted to engage the inner surface of the rim 17, and adjacent its outer periphery each disk is provided with an annular groove 52 adapted to enclose the respective series of radial grooves 23 and 47. The disk 50 is provided with the usual hub cap 53 preferably formed integral therewith, and outwardly of the hub the disks 49 and 50 are provided with alined openings 54. The disk 49 is provided with a relatively large central opening 49' in alinement with the opening 26 in the disk 22. As shown in Figure 2 a bolt 55 having a head 56 extends through the openings in the disks 13, 22, 45 and 50, said bolt extending through the tubular spacer 46. A nut 57 or the like is adapted to be threaded on the opposite extremity of the bolt to secure the parts together. Between their outer peripheries and the groove 52 the disks 49 and 50 are provided with openings 58 in alinement with the openings in the disks 22 and 45 and the openings in the rib 19, and arms 28 of the bracket 27. A bolt 59 is adapted to extend through these openings, one end of the bolt being provided with a head 60, the opposite end being threaded to receive a nut 61 or other suitable securing member. A rubber tire 62 may be suitably secured to the rim 17, said tire being adapted to fit between the flanges 18.

The operation of my improved wheel is believed to be apparent. As stated, the inner portion 12 of the wheel is secured to a vehicle axle and is provided with the relatively large openings 16. The spacers 46 serve to space the disks 22 and 45 apart and as will be noted, these spacers are normally arranged substantially centrally of the openings 16. It is also to be noted that the central openings 26, 45' and 49' of the disks 22, 45 and 49 respectively, are larger than the axle 10, and that the hub cap 53 is slightly smaller than the openings 26 and 45'. When the wheel is subjected to a shock or strain, the rim 17 and the disks 22, 45, 49 and 50, are movable relative to the inner portion 12 because of the large openings above mentioned and because of the openings 16 in the disks 13. The links 35 and 37 will help to distribute the force of shocks and strains over substantially the whole area of the wheel and the plurality of coil springs will also help such distribution, and at the same time, act as absorbers for the lesser shocks and strains.

The wheel is designed primarily for use with solid tires, but it is apparent that it is also capable of use with other styles of tires.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described having an inner annular portion adapted to engage a vehicle axle, an outer annular portion radially spaced from said inner portion, a plurality of connecting members arranged between and pivotally connected to said inner and outer portions, a plurality of radially disposed coil springs freely mounted between said inner and outer portions, said inner portion being provided with a plurality of relatively large spaced openings, a pair of spaced annular disks secured to said outer portion, spacing means arranged between said disks and extending through said openings, said spacing means being of less diameter than said openings to allow radial movement of said outer portion with respect to said inner portion, and a second pair of annular disks arranged outwardly of said other disks.

2. A device of the character described having an inner annular portion adapted to engage a vehicle axle, an outer annular portion radially spaced from said inner portion, a plurality of links arranged between and pivotally connected to said inner and outer portions, said links having portions curved substantially the same as the periphery of said inner annular portion, said portions of said links being normally divergent outwardly from the periphery of said inner annular portion, a plurality of coil springs arranged between said outer annular portion and said curved portions of said links, said inner annular portion being provided with a plurality of relatively large spaced openings, a pair of spaced annular disks secured to said outer portion, spacing means arranged between said disks and extending through said openings, said spacing means being of less diameter than said openings to allow radial movement of said outer portion with respect to said inner portion, and a second pair of disks arranged outwardly of said other disks.

In testimony whereof I affix my signature.

DULY E. TUTT.